United States Patent [19]
Ellis

[11] Patent Number: 5,711,106
[45] Date of Patent: Jan. 27, 1998

[54] LANDSCAPE EDGING PRODUCT

[76] Inventor: Craig A. Ellis, 11402 Nora Dr., Fenton, Mich. 48430

[21] Appl. No.: 640,532

[22] Filed: May 1, 1996

[51] Int. Cl.⁶ ................................................. A01G 13/10
[52] U.S. Cl. ................................................. 47/25; 47/23
[58] Field of Search ....................... 47/3, 23, 25, 33, 47/58, 84

[56] References Cited

U.S. PATENT DOCUMENTS

| | | |
|---|---|---|
| 313,424 | 3/1885 | Hughes . |
| 2,235,356 | 3/1941 | Byers . |
| 2,782,561 | 2/1957 | Smith .................. 47/25 |
| 2,978,837 | 4/1961 | Daniels ................. 47/25 |
| 3,015,448 | 1/1962 | Hurless . |
| 3,491,660 | 1/1970 | Kwasney . |
| 3,520,082 | 7/1970 | Smith . |
| 3,745,701 | 7/1973 | Marvin . |
| 4,031,676 | 6/1977 | Dally . |
| 4,074,479 | 2/1978 | Krupka . |
| 4,268,992 | 5/1981 | Scharf, Sr. . |
| 4,308,688 | 1/1982 | Revane . |
| 4,349,989 | 9/1982 | Snider, Jr. . |
| 4,431,166 | 2/1984 | Marshall ............... 47/25 X |
| 4,502,244 | 3/1985 | Yoham . |
| 4,835,921 | 6/1989 | Baggett Jr. et al. . |
| 4,858,378 | 8/1989 | Helmy . |
| 4,976,063 | 12/1990 | Young . |
| 4,986,025 | 1/1991 | Imperial . |
| 5,065,543 | 11/1991 | Brook . |
| 5,184,421 | 2/1993 | Meharg . |
| 5,323,557 | 6/1994 | Sonntag ................ 47/25 |
| 5,325,627 | 7/1994 | Anderson .............. 47/25 X |
| 5,367,822 | 11/1994 | Beckham ............... 47/25 |
| 5,442,877 | 8/1995 | Lindhal ................. 47/33 |
| 5,452,541 | 9/1995 | DeMaio ................. 47/25 X |

*Primary Examiner*—Henry E. Raduazo
*Assistant Examiner*—Robert Pezzuto
*Attorney, Agent, or Firm*—Harness, Dickey & Pierce

[57] ABSTRACT

A landscape edging system has an inverted V-shaped outer edge with has an inner leg and an outer leg with the outer leg being longer than the inner leg. The inner leg mates with a base which encloses the interior of the system and with the inner leg forms a compression space. This compression space allows the outer leg to rest against the ground with the covered grass being compressed within the compression space. One embodiment of the system is a one-piece circular component which can be mated with a pot to provide a potting container for retail sales. Another embodiment has a base of a predefined shape with outer edging frames being attached around the outer periphery of the base to create the edging system. Another embodiment has a group of semi-circular edging components which can be connected together with or without a group of inserts to form various geometric shapes.

15 Claims, 10 Drawing Sheets

LANDSCAPE EDGING PRODUCT

FIELD OF THE INVENTION

The present invention relates to a product which forms an edging for landscaping projects. More particularly, the present invention relates to an edging system which comprises various inter-fitting components to produce planting beds or the like in a variety of shapes or configurations.

BACKGROUND OF THE INVENTION

Landscape edging components for defining the line between a lawn and a garden or for surrounding the base of a tree are well known in the art. These components are available in many designs which range from the narrow individual pieces which interlock to allow free forming of the edging to the long flexible strips of edging which can also be free formed to produce the desired shape of the dividing edge. These prior art landscape edging components come in a variety of sizes and cross sections and there are multiple methods which are used to maintain the edging in its desired location.

The prior art landscape edging components have been widely accepted but the installation of these components requires a significant amount of manual labor. This is due to the fact that these prior art components are all designed to be inserted into the ground which normally requires manual digging. In addition, the area enclosed by the landscape edging needs to have the soil removed, tilled or otherwise disturbed in order to provide for additional plantings or decorative material such as stone, bark, wood chips or the like. Finally, once the enclosed area has been finished with plantings, stone, bark, wood chips or the like, the area must be continuously maintained in order to remove unwanted grass and/or weeds.

Accordingly, the continued development of landscape edging products has been directed towards systems which simplify their installation and the landscaping of the newly enclosed area. In addition, the development of these components has also been directed towards the reduction or elimination of maintenance of the landscaping project once it has been completed.

SUMMARY OF THE INVENTION

The present invention provides the art with a landscape edging system which is designed to be placed directly on top of the ground or on the top of an existing lawn to define a planting bed or the like. The system is comprised of a plurality of snap together components which can be assembled in a variety of ways to define numerous shapes for the planting bed. The system incorporates an internal floor which discourages the growth of grass and/or weeds. A series of drain holes are provided in the internal floor to provide for water drainage. Once assembled, the interior of the system can be filled with dirt, stones, bark, wood chips or the like to provide the desired appearance.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
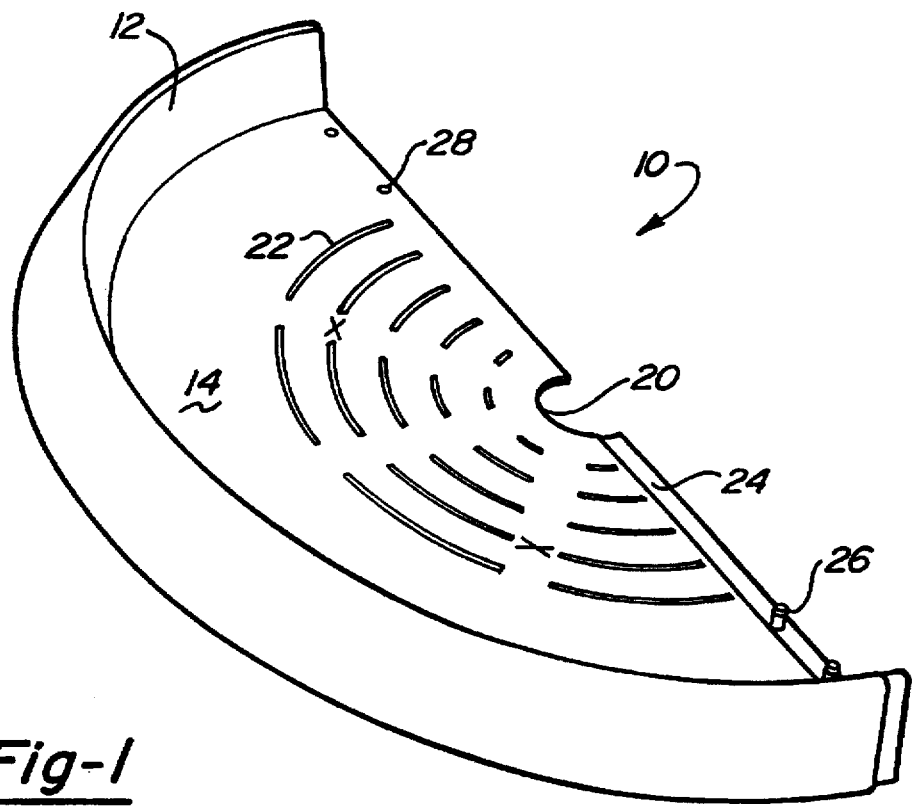
FIG. 1 is a perspective view of an insert which forms one component of the landscape edging system in accordance with the present invention.
Figure 2:
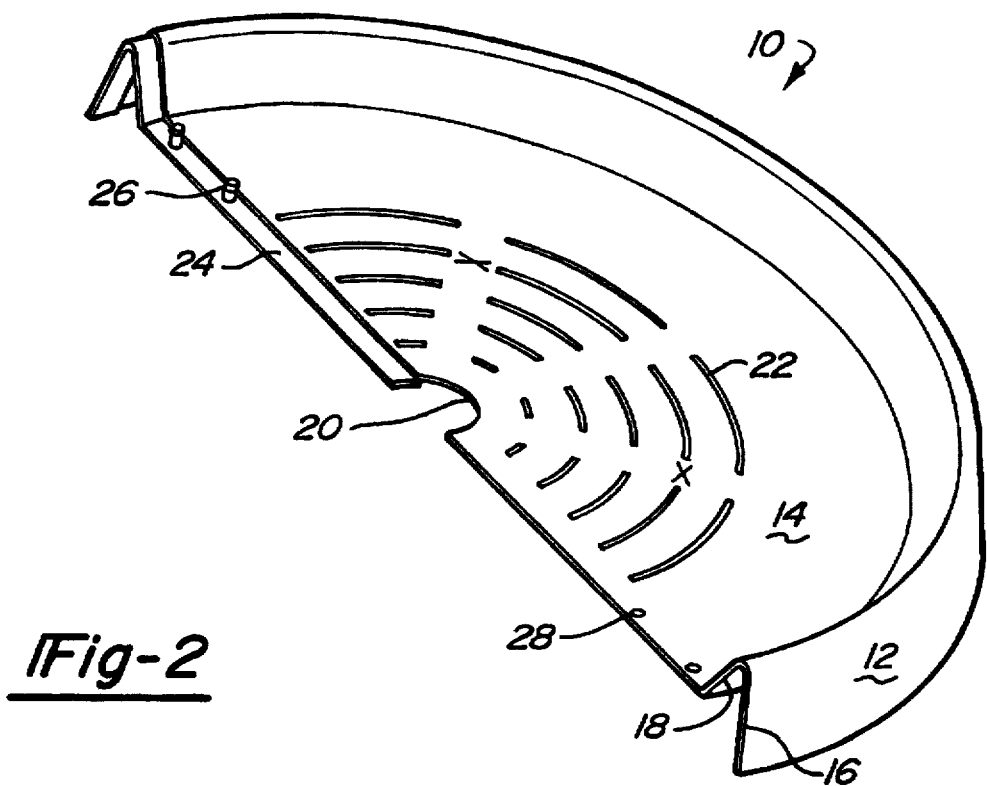
FIG. 2 is an opposite perspective view of the insert shown in FIG. 1.
Figure 3:
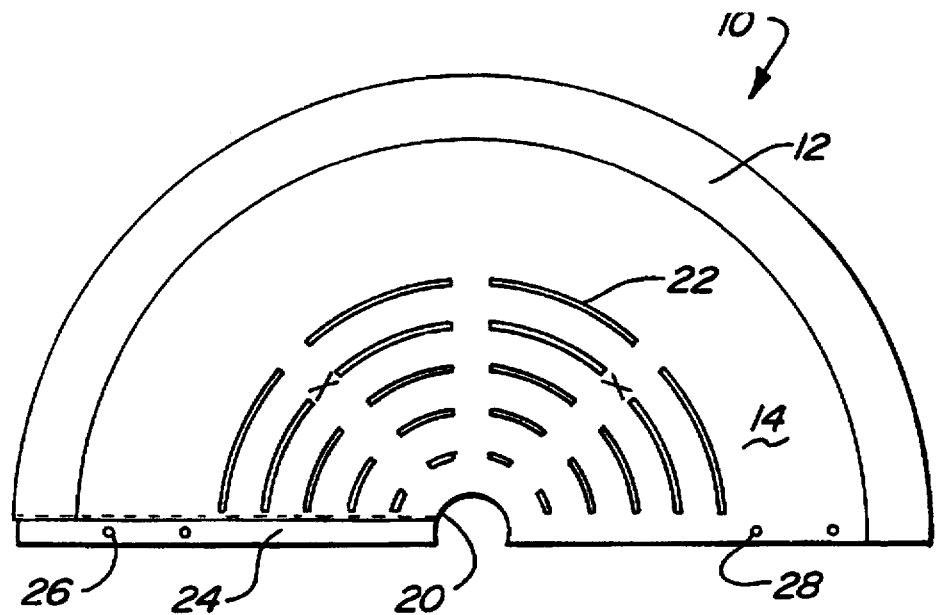
FIG. 3 is a top plan view of the insert shown in FIG. 1.
Figure 4:
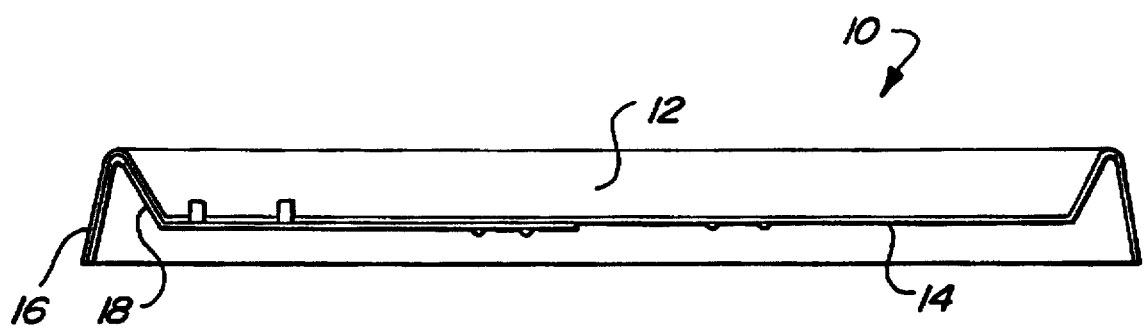
FIG. 4 is an edge view of the insert shown in FIG. 1.

Referring now to the drawings in which like reference numerals designate like or corresponding parts throughout the several views, there is shown in FIGS. 1 through 4 a semi-circular insert 10 which forms a portion of the landscaping edging system in accordance with the present invention. Insert 10 is a semi-circular component which defines an inverted V-shaped edge 12 and a base 14. Edge 12 includes an outer leg 16 and an inner leg 18. Outer leg 16 extends further downward than inner leg 18 as shown in FIG. 4. Base 14 mates with the entire circumferential edge of inner leg 18 to enclose the center portion of insert 10. Base 14 defines a semi-circular cut-out 20 which is provided to accept the trunk of a tree or other planting which is designed to extend through insert 10. Base 14 also defines a plurality of semi-circular shaped slots or indentations 22 which assist the end user in the enlarging of cut-out 20 to facilitate larger tree trunks or plantings.

One edge of insert 10 is provided with a recessed lip 24 which extends the length of base 14 and through inner and outer legs 18 and 16 of V-shaped edge 12. A pair of studs 26 are integrally formed with lip 24 and extend upward from recessed lip 24. Studs 26 are designed to mate with a pair of corresponding holes 28 located on another insert 10 or other inserts as described in greater detail below.

Figure 5:
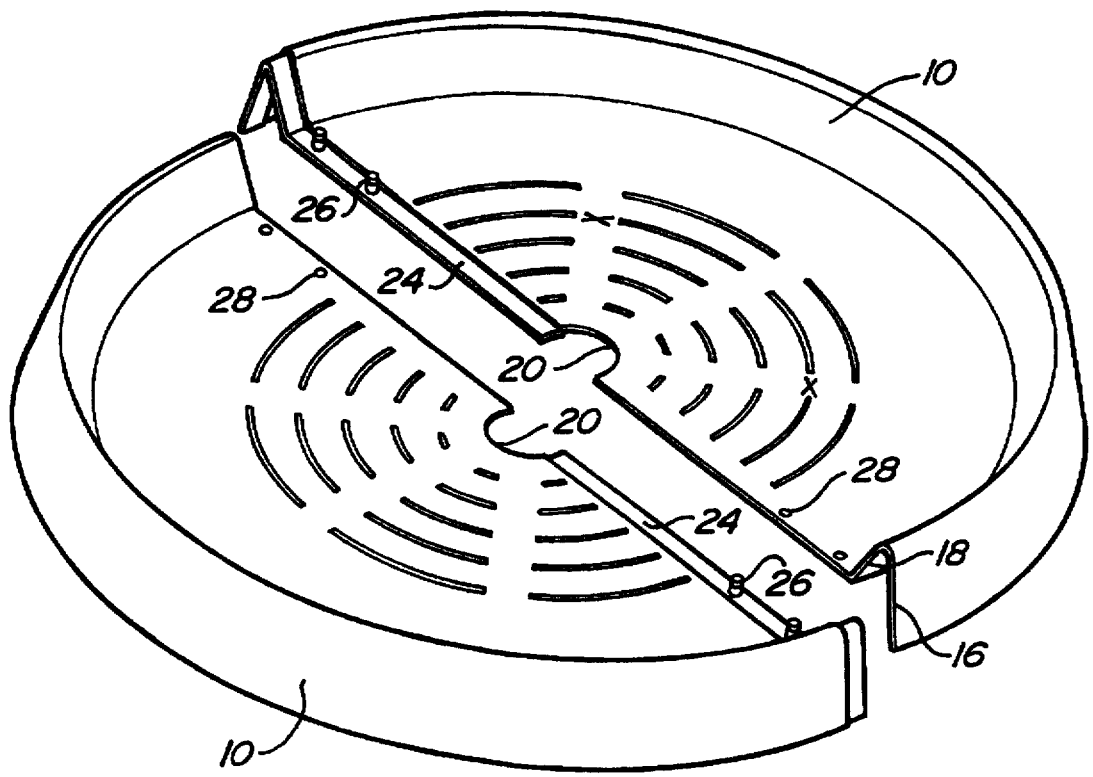
FIG. 5 is an exploded perspective view illustrating the configuration possible when using a pair of the inserts shown in FIG. 1.

A pair of inserts 10 combine to create a circular skirt for a tree or planting as shown in FIG. 5. The first insert 10 is positioned around the tree or planting desired after enlarging cut-out 20 if required. The second insert 10 is mated with the first insert 10 by aligning recessed lip 24 on the first insert with the non-recessed edge on the second insert. This simultaneously aligns the recessed lip 24 in the second insert 10 with the non-recesses edge on the first insert 10. Studs 26 on both inserts 10 are inserted through the corresponding hole 28 on the opposite insert 10 and this assembly is positioned on the ground in the proper position relative to the tree or planting. The difference in height between inner leg 18 and outer leg 16 causes outer leg 16 to support each insert 10 against the ground. Inner leg 18 and base 14 are thus suspended above the surface of the ground providing a compression space for the covered grass. Once assembled, the interior of the two assembled inserts 10 can then be filled with the desired material to provide the desired appearance.

When installation is complete, base 14 discourages the growth of weeds while slots 22 and/or cut-out 20 provide for water drainage. Growth of the enclosed tree trunk or plant can be accommodated for by disassembling inserts 10, enlarging cut-out 20 and reassembling inserts 10 or cut-out 20 can simply be enlarged while inserts 10 are positioned around the tree trunk or planting.

Figure 6A:
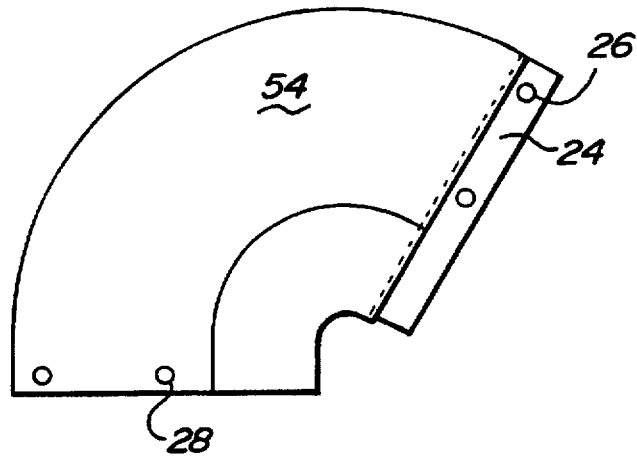
FIG. 6A is a top plan view of another insert in accordance with the present invention.
Figure 6B:
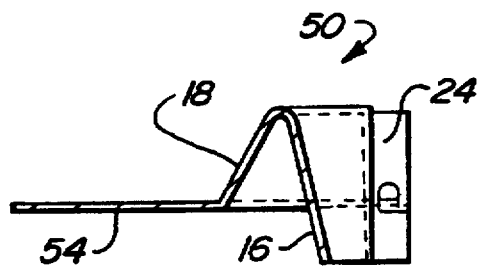
FIG. 6B is a side view of the insert shown in FIG. 6A.
Figure 7:
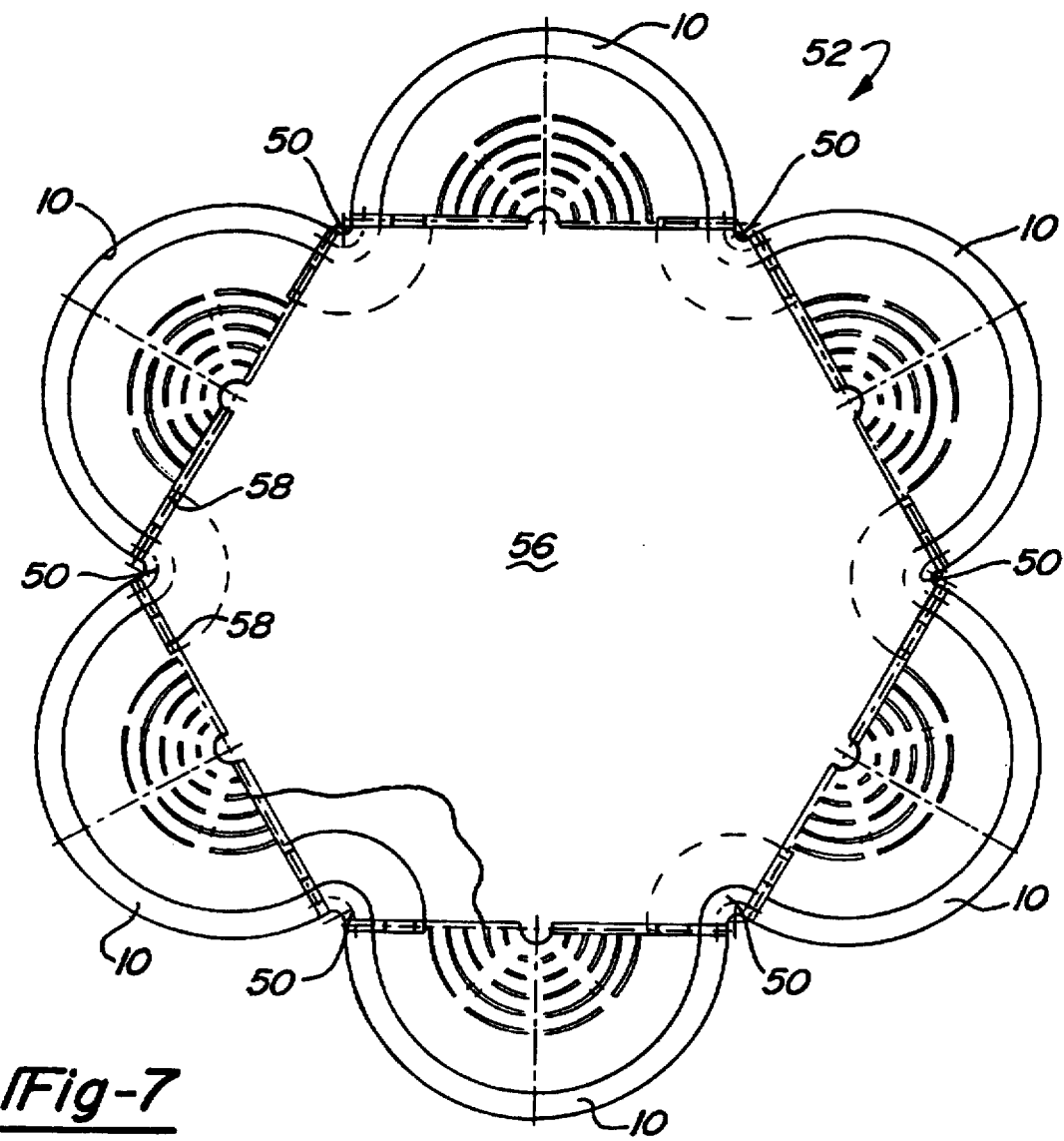
FIG. 7 is a top plan view illustrating one configuration possible using the inserts shown in FIGS. 1, 6A and 6B.
Figure 8:
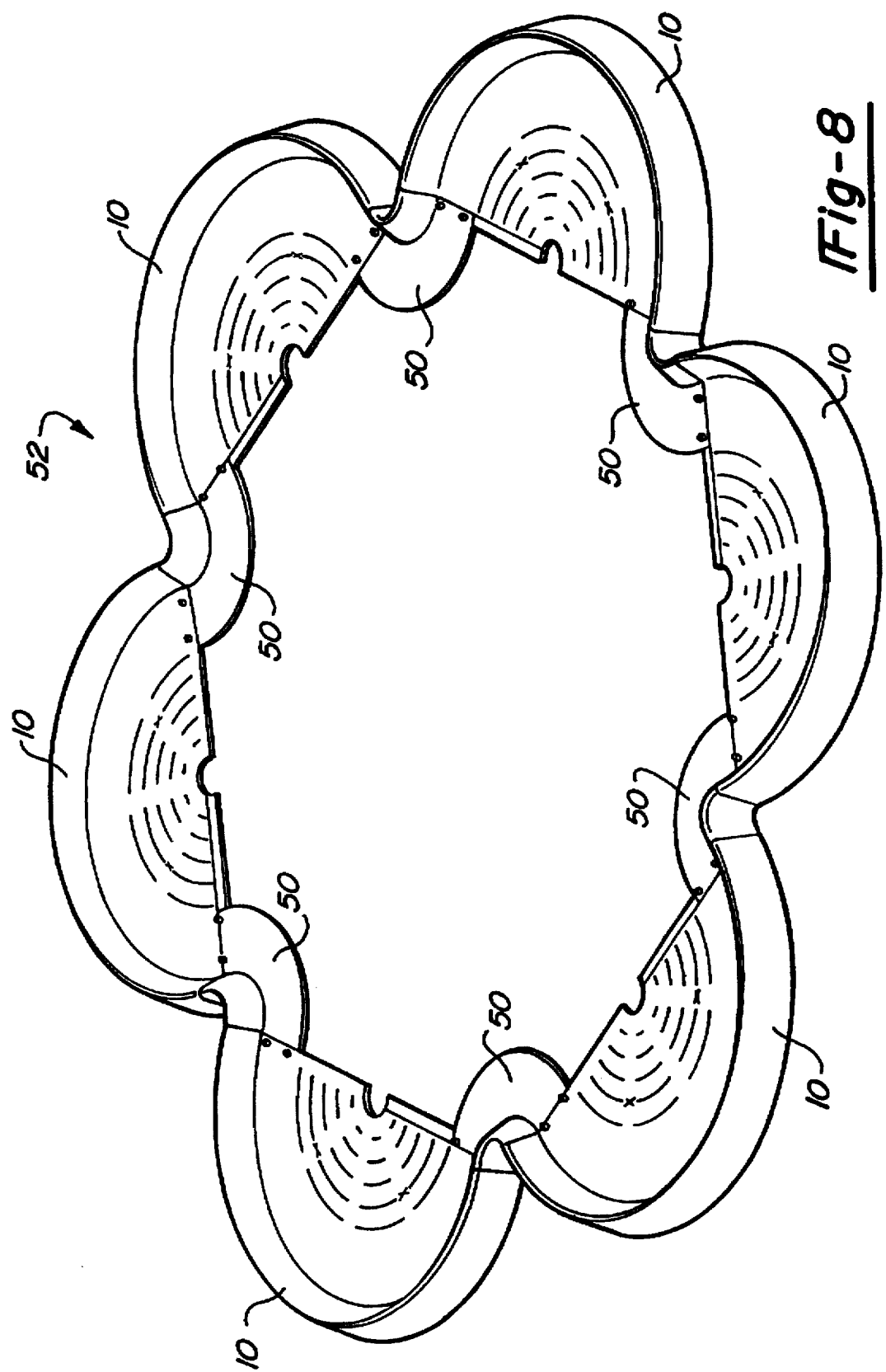
FIG. 8 is a perspective view of the configuration shown in FIG. 7.

FIGS. 6A and 6B illustrates a 120° corner 50 which is utilized when combining a plurality of inserts 10 to form a skirt or planing bed which is of a configuration which is not circular. Corner 50 includes outer leg 16, inner leg 18, recessed lip 24, studs 26 and holes 28. Base 14 is replaced by flange 54 which is designed to mate with a portion of a corresponding base 14 or with another flange 54 depending on the configuration desired. FIG. 7 illustrates a daisy design 52 which utilizes six inserts 10, six corners 50 and a base center section 56. Center section 56 is die-cut in order to form a plurality of holes 56 which correspond to the locations of studs 26 on the six inserts 10 and the six corners 50. FIG. 8 illustrates a perspective view of design 52 with center section 56 removed for the purposes of clarity.

Figure 9B:
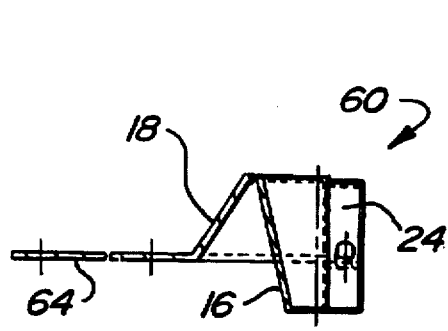
FIG. 9B is a side view of the insert shown in FIG. 9A.
Figure 9A:
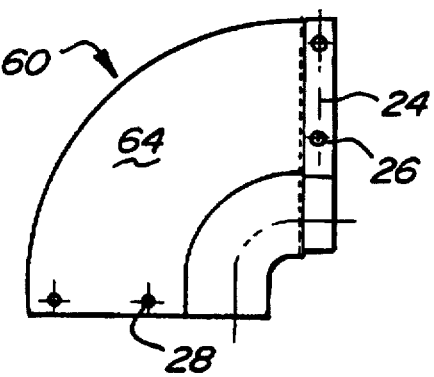
FIG. 9A is a top plan view of another insert in accordance with the present invention.
Figure 10:
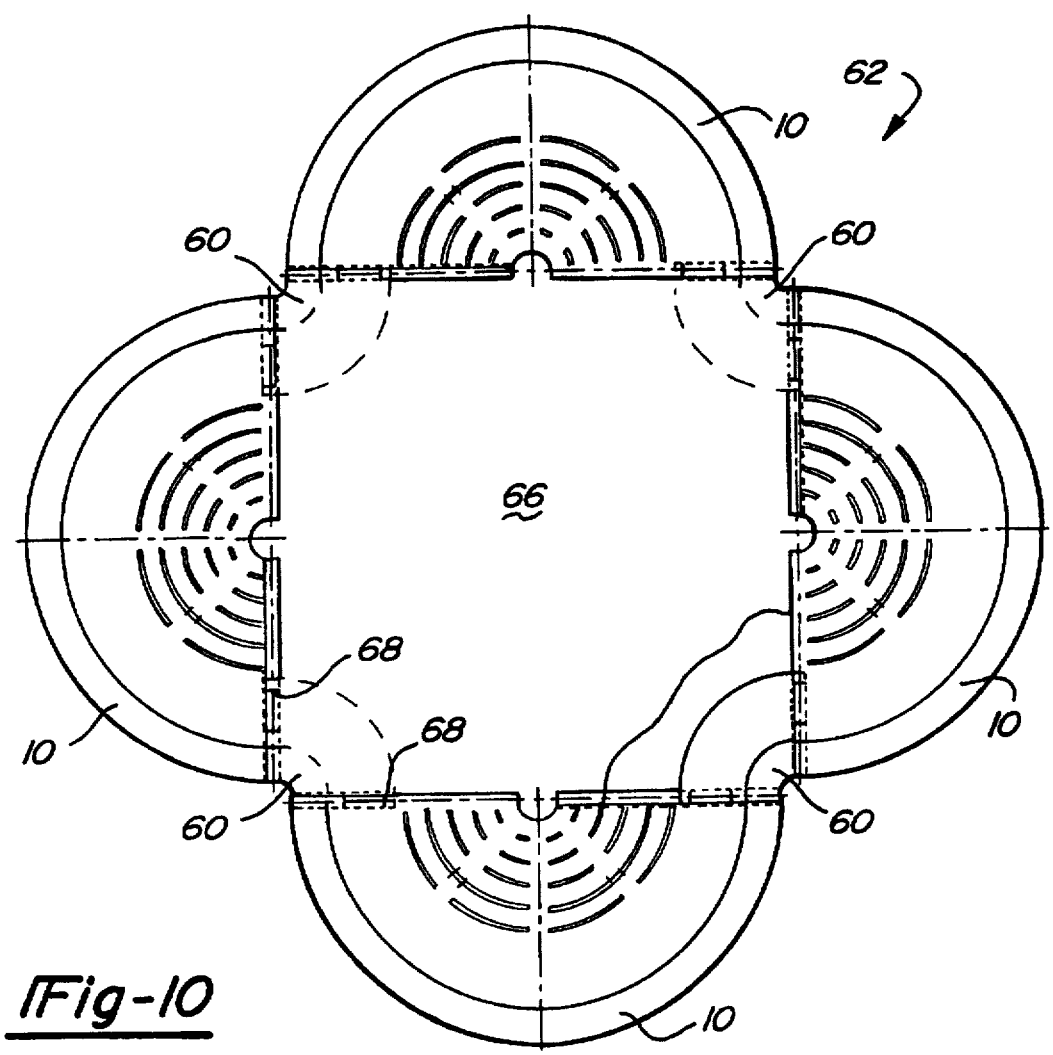
FIG. 10 is a top plan view illustrating one configuration possible using the inserts shown in FIGS. 1, 9A and 9B.

FIGS. 9A and 9B illustrates a 90° corner 60 which is utilized when combining a plurality of inserts 10 to form a skirt or planing bed which is of a different configuration which is also not circular. Corner 60 includes outer leg 16, inner leg 18, recessed lip 24, studs 26 and holes 28. Base 14 is replaced by flange 64 which is designed to mate with a portion of a corresponding base 14 or with another flange 64 depending on the configuration desired. FIG. 10 illustrates a cloverleaf design 62 which utilizes four inserts 10, four corners 60 and a base center section 66. Center section 66 is die-cut in order to form a plurality of holes 68 which correspond to the locations of studs 26 on the four inserts 10 and the four corners 60.

Figure 11:
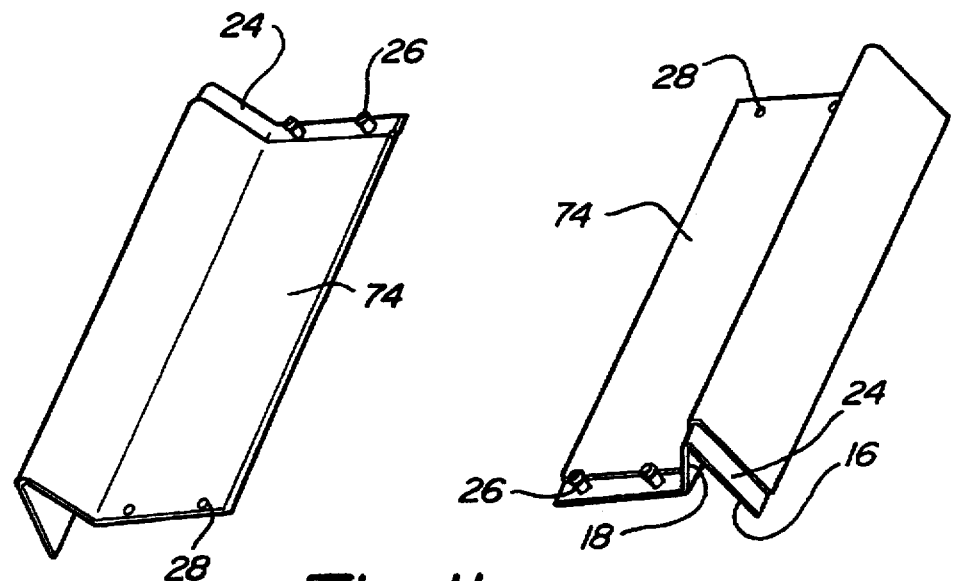
FIG. 11 is a perspective view of another pair of inserts in accordance with the present invention.
Figure 12:
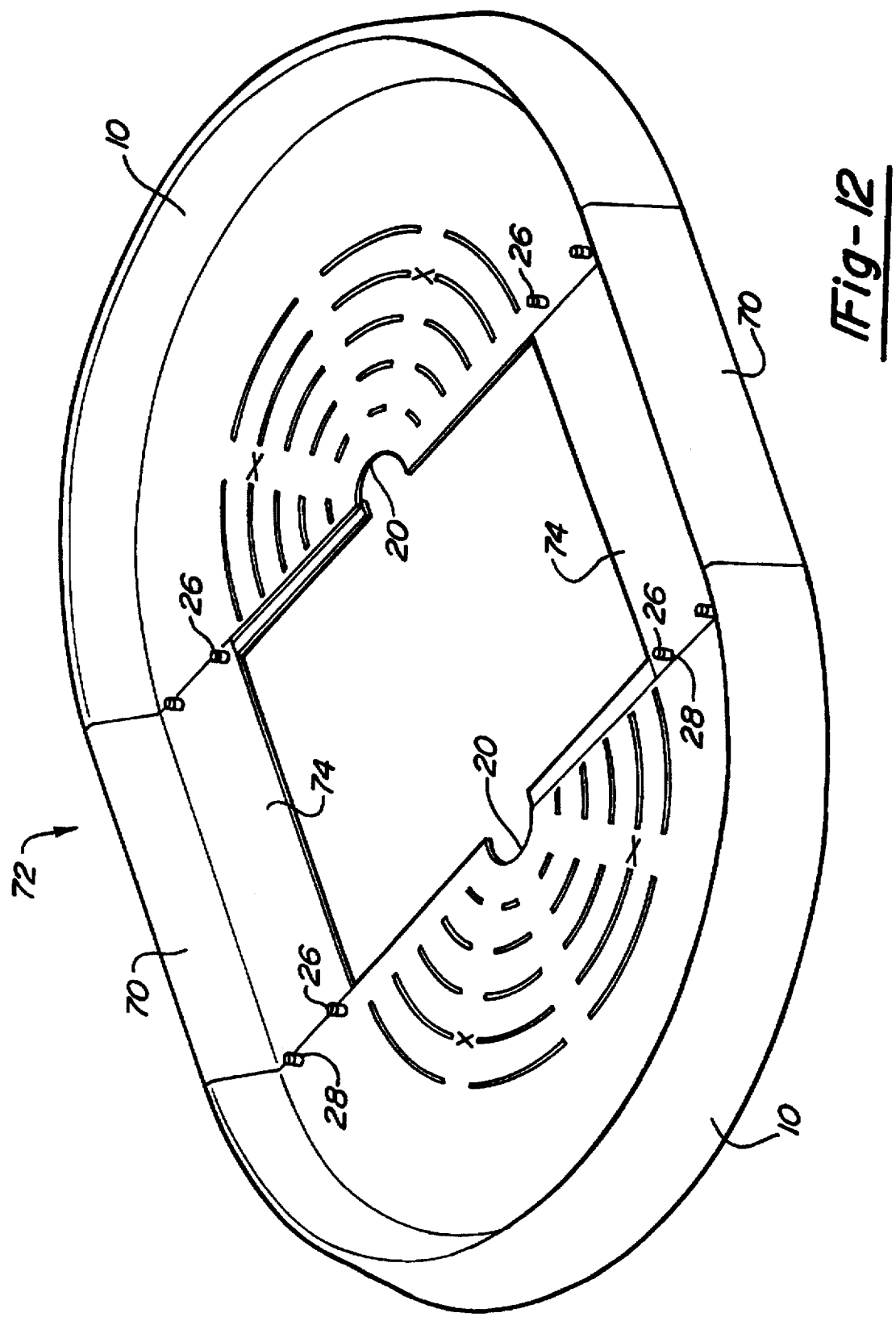
FIG. 12 is a perspective view illustrating one configuration possible using the inserts shown in FIGS. 1 and 11.

FIG. 11 illustrates a pair of inserts 70 which are designed to be inserted between two inserts 10 to produce an oval design 72 shown in FIG. 12. Each insert 70 includes outer leg 16, inner leg 18, a recessed lip 24, a set of studs 26 and a set of holes 28. Base 14 is replaced by a flange 74 which extends far enough to properly locate studs 26 and holes 28. While FIG. 12 illustrates a pair of inserts 70 being inserted between two inserts 10, it is within the scope of the present invention to insert a plurality of pairs of inserts 70 between the pair of inserts 10 by interconnecting adjacent pairs of inserts 70 and connecting inserts 10 to the two outside pair of inserts 70. The open area between inserts 10 and 70 can be covered by a piece of "geo textile" fabric or light gauge polyethylene sheeting in order to deter the growth of unwanted grass and/or weeds.

Figure 13:
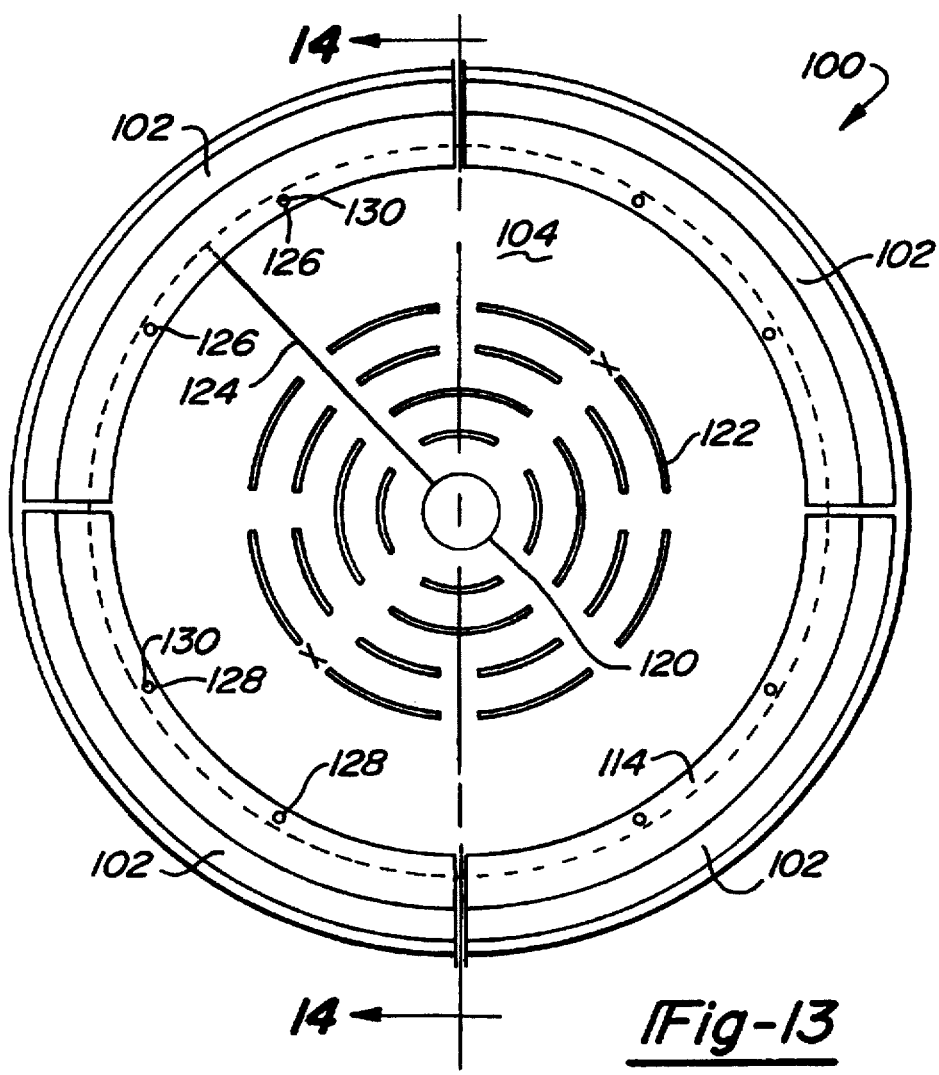
FIG. 13 is a top plan view illustrating a configuration possible using inserts in accordance with another embodiment of the present invention.
Figure 14:
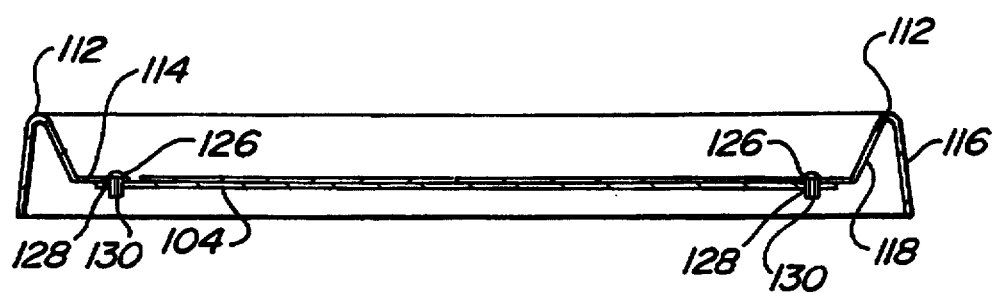
FIG. 14 is a side cross-sectional view taken in the direction of arrows 14—14 shown in FIG. 13.

FIGS. 13 and 14 illustrate a landscape edging system in accordance with another embodiment of the present invention. A circular skirt or planting bed 100 comprises four generally 90° edge pieces 102 and a circular inner mat 104. Each edge piece 102 comprises an inverted V-shaped edge 112 and a base flange 114. Edge 112 includes an outer leg 116 and an inner leg 118. Outer leg 116 extends further downward than inner leg 118 in a similar manner and for a similar purpose as outer leg 16 and inner leg 18 of insert 10. Flange 114 extends along the entire inward curved edge of inner leg 118 and includes a pair of holes 126 which are designed to mate with inner mat 104 as will be described later herein. Inner mat 104 mates with edge pieces 102 to form circular skirt 100. Mat 104 defines a circular cut-out 120 which is provided to accept the trunk of a tree or other planting which is designed to extend through skirt 100. Mat 104 also defines a plurality of circular shaped slots or indentations 122 which assist the end user in the enlarging of cut-out 120 to facilitate larger tree trunks or plantings. Installation of mat 104 around a tree or planting can be accomplished by providing a radial cut 124 from the outside edge of mat 104 to cut-out 120. This radial cut can be provided with mat 104 or it can be made at the time of the installation of planting bed 100. While FIGS. 13 and 14 are shown using circular inner mat 104, it is to be understood that it is within the scope of the present invention to replace inner mat 104 with a "geo textile" fabric or a sheet of light-gauge polyethylene sheeting if desired.

Mat 104 is provided with a plurality of holes 128 which are designed to mate with holes 126 of each edge piece 102 to form skirt 100. Each pair of holes 128 in edge piece 102 is aligned with a corresponding pair of holes 126 in mat 104 and a fastener 130 is snapped through holes 126 and 128 to maintain each edge piece 102 in its desires location. Once assembled, the interior of skirt 100 can be filled with the desired material to provide the desired appearance.

When assembly is complete, inner mat 104 discourages the growth of weeds while slots 122 and/or cut-out 120 provide for water drainage. Growth of the enlarged tree can be accommodated for by disassembling skirt 100, enlarging cut-out 120 and reassembling skirt 100 or cut-out 120 can simply be enlarged while inserts 10 are positioned around the tree trunk or planting.

Figure 15:
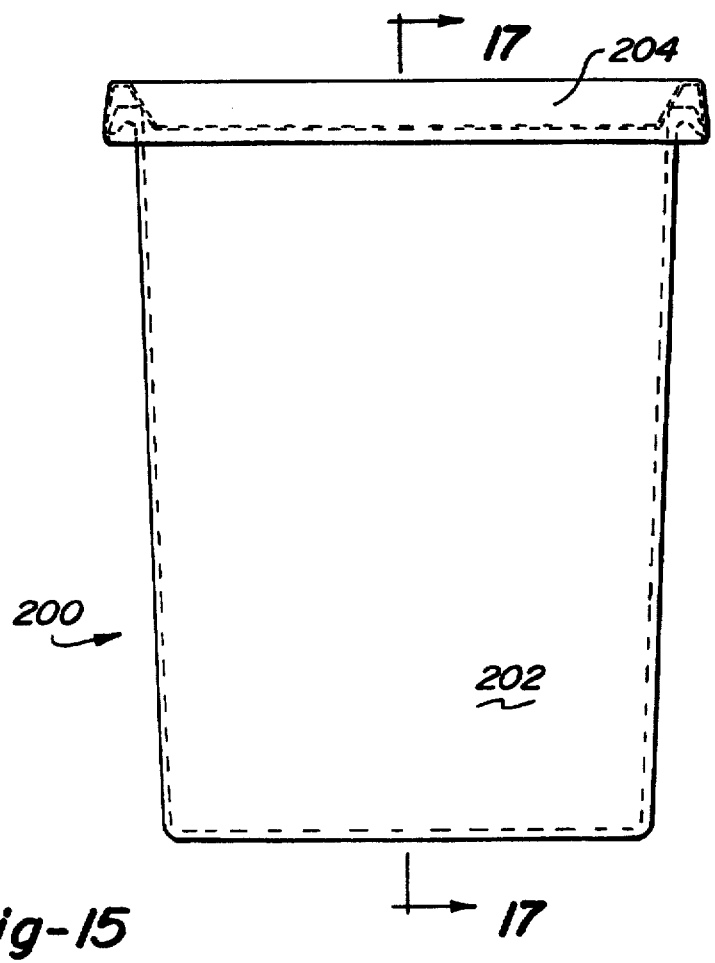
FIG. 15 is a side view of a planting container incorporating the landscape edging system in accordance with another embodiment of the present invention.
Figure 16:
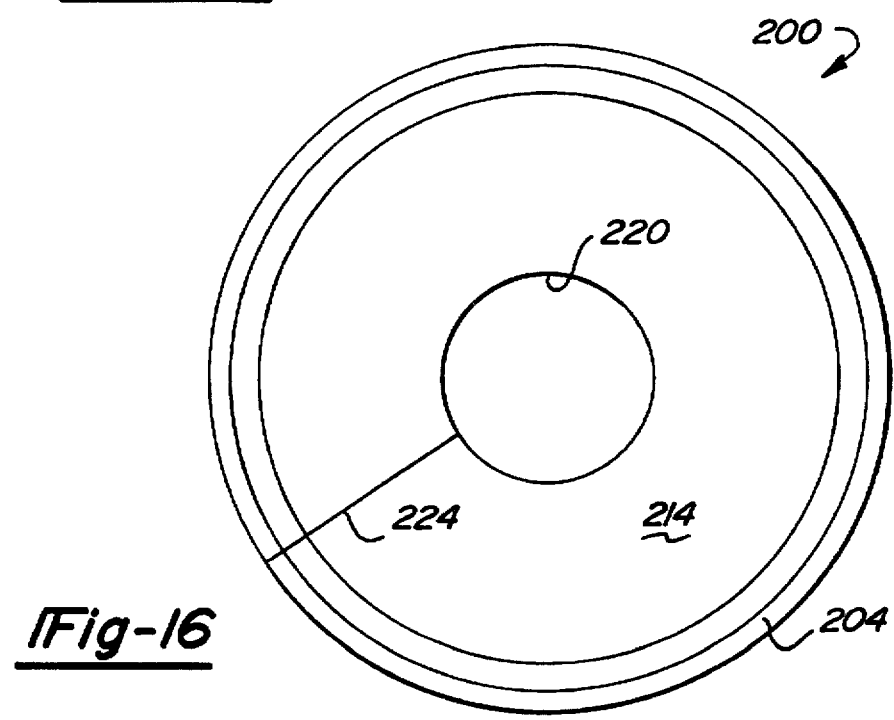
FIG. 16 is a top plan view of the planting container shown in FIG. 15.
Figure 17:
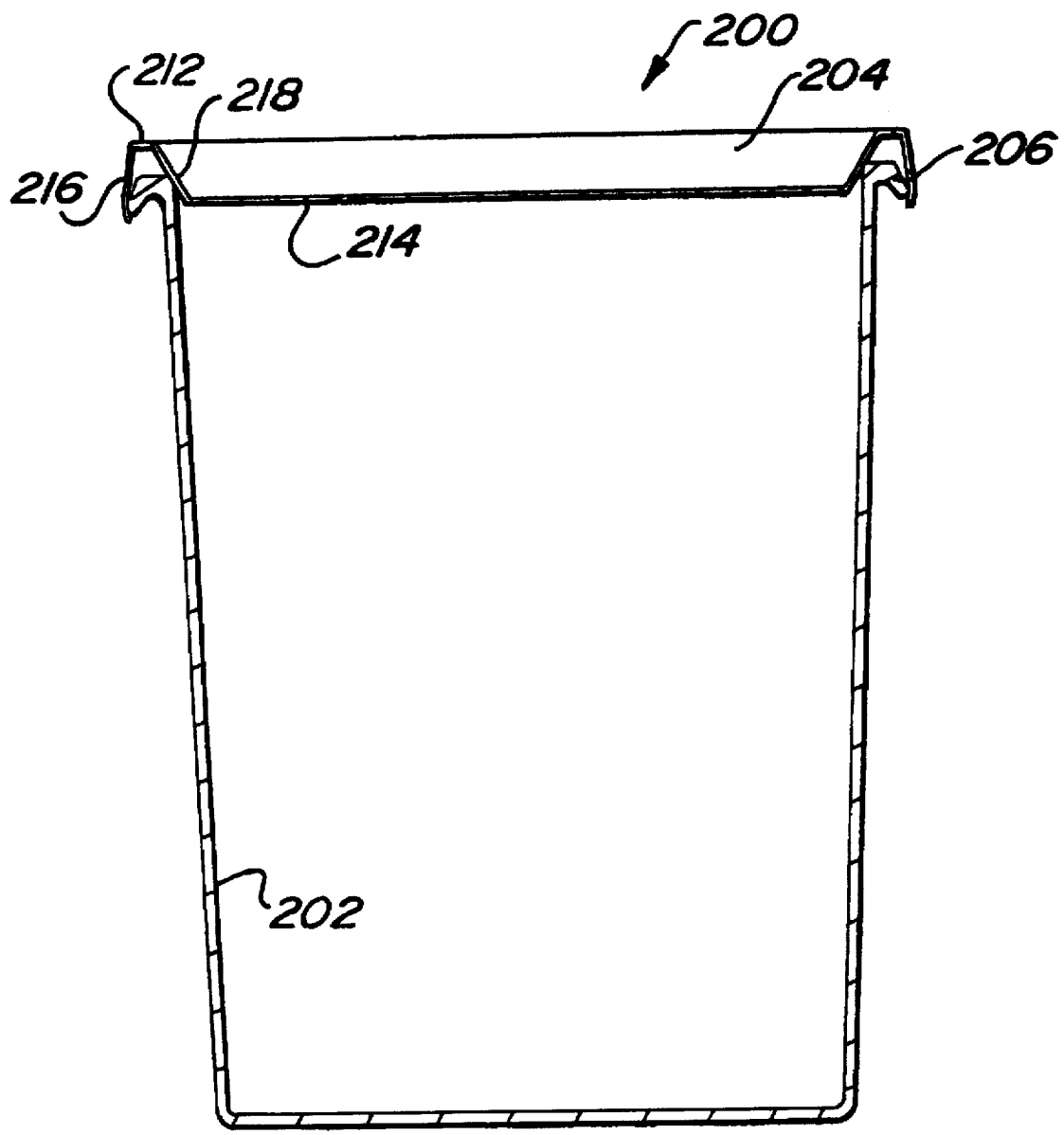
FIG. 17 is a side cross-sectional view taken in the direction of arrows 17—17 shown in FIG. 15.

FIGS. 15 through 17 disclose another embodiment of the present invention where a potting container 200 is illustrated. Potting container 200 comprises a pot 202 and a lid 204. Potting container 200 is designed to be supplied directly to the nursery market or the like. Pot 202 is a conventional sized pot which the grower can utilize to ship his product to the retail outlet. Pot 202 includes a flange 206 extending around the edge of the pot opening to provide for the snap fit assembly and retention of lid 204.

Lid 204 is a single piece lid which incorporates the features of the landscape edging system of the present invention. Lid 204 includes an inverted V-shaped edge 212 and a base 214. Edge 212 includes an outer leg 216 and an inner leg 218. Outer leg 216 extends further downward than inner leg 218 as shown in FIG. 17 and includes a curved under portion to provide the snap fit relationship with flange 206 to retain lid 204 on pot 202. The difference in height between inner leg 218 and outer leg 216 is similar to outer leg 16 and inner leg 18 of insert 10 to accomplish the same purpose. Base 214 mates with the entire circumferential edge of inner leg 218 to close the center portion of lid 204. Base 214 defines a circular hole 220 which is provided to accept the trunk of a tree or other planting which is located within pot 202. Installation of lid 204 around a tree or planting can be accomplished by providing a radial cut 224 from the outside edge of lid 204 to cut-out 220. This radial cut can be provided with lid 204 or it can be made at the time of the assembly of lid 204 with pot 202. An alternate method of providing for the assembly of lid 204 would be to make lid 204 a two-piece construction similar to insert 10 shown in FIGS. 1 through 5.

While the above detailed description describes the preferred embodiment of the present invention, it should be understood that the present invention is susceptible to modification, variation and alteration without deviating from the scope and fair meaning of the subjoined claims.

What is claimed is:

1. A landscape edging system comprising at least two generally semi-circular shaped frames, each of said semi-circular frames adapted to rest on a ground surface and comprising:

a generally semi-circular inverted V-shaped frame edge, said V-shaped frame edge including an outer leg and an inner leg, said outer leg of said frame edge being longer than said inner leg of said frame edge; and a base extending radially inward from said inner leg of said frame edge over substantially an entire circumferential length of said inner leg of said frame edge, said base in conjunction with said outer leg of said frame edge adapted to position said base in spaced relation above said ground surface and defining a first compression space disposed below said base and said inner leg of said frame edge.

2. The landscape edging system according to claim 1 wherein, said base defines a generally semi-circular aperture.

3. The landscape edging system according to claim 1 wherein, said base defines at least one aperture and at least one stud, said aperture on said base of one of said frames being designed to engage said stud on said base of the other of said frames to lock said frames into a generally circular shape.

4. The landscape edging system according to claim 1 further comprising a plurality of inserts, each of said plurality of inserts comprising:

a generally inverted V-shaped insert edge said V-shaped insert edge including an outer leg and an inner leg, said outer leg of said insert edge being longer than said inner leg of said insert edge; and a flange extending from said inner leg of said insert edge over substantially an entire circumferential length of said inner leg of said insert edge, said flange in conjunction with said outer leg of said insert edge defining a second compression space disposed below said base and said inner leg of said insert edge.

5. The landscape edging system according to claim 4 wherein, said plurality of inserts comprises two inserts and said at least two semi-circular frames comprises two frames, said two inserts mating with said two semi-circular frames to form a generally oval shape.

6. The landscape edging system according to claim 5 wherein, said flange of each insert defines at least one aperture and at least one stud, said aperture on one of said flanges mating with said stud on one of said semi-circular flanges, said stud on said one flange mating with said aperture on the other of said semi-circular frames to lock said inserts and said frames together.

7. The landscape edging system according to claim 4 wherein, said plurality of inserts comprises four inserts and said at least two semi-circular frames comprises four frames, said four inserts mating with said four semi-circular frames to form a generally cloverleaf shape.

8. The landscape edging system according to claim 7 wherein, said flange of each insert defines at least one aperture and at least one stud, said aperture on one of said flanges mating with said stud on one of said semi-circular flanges, said stud on said one flange mating with said aperture on another of said semi-circular frames to lock said inserts and said frames together.

9. The landscape edging system according to claim 4 wherein, said plurality of inserts comprises six inserts and said at least two semi-circular frames comprises six frames, said six inserts mating with said six semi-circular frames to form a generally daisy shape.

10. The landscape edging system according to claim 9 wherein, said flange of each insert defines at least one aperture and at least one stud, said aperture on one of said flanges mating with said stud on one of said semi-circular flanges, said stud on said one flange mating with said aperture on another of said semi-circular frames to lock said inserts and said frames together.

11. A landscape edging system comprising a plurality of frames and a base, each of said frames adapted to rest on a ground surface and comprising:

a generally inverted V-shaped edge, said V-shaped edge including an outer leg and an inner leg, said outer leg being longer than said inner leg; and said base defining an outer peripheral edge, each of said plurality of frames being secured to said outer peripheral edge of said base such that said plurality of frames extend around substantially an entire circumferential length of said outer peripheral edge, said base in conjunction with said outer legs of said frames adapted to position said base in spaced relation above said ground surface and defining a compression space disposed below said base and said inner legs of said frames.

12. The landscape edging system according to claim 11 wherein, said base is generally circular and said plurality of frames comprises four frames.

13. A generally circular frame for a landscaping system, said circular frame adapted to rest on a ground surface and comprising:

a generally circular inverted V-shaped edge, said V-shaped edge including an outer leg and an inner leg, said outer leg being longer than said inner leg; and a base extending radially inward from said inner leg over substantially an entire circumferential length of said inner leg, said base in conjunction with said outer leg adapted to position said base in spaced relation above said ground surface and defining a compression disposed below said base and said inner leg.

14. The frame according to claim 13 wherein, said base defines a generally circular aperture.

15. The frame according to claim 13 wherein, said outer leg of said frame is adapted to engage a pot, said pot and said frame creating a potting container.

* * * * *